(12) United States Patent
Wu et al.

(10) Patent No.: US 7,488,086 B2
(45) Date of Patent: Feb. 10, 2009

(54) RETROFITTING OF FLUORESCENT TUBES WITH LIGHT-EMITTING DIODE (LED) MODULES FOR VARIOUS SIGNS AND LIGHTING APPLICATIONS

(75) Inventors: Chen-Ho Wu, Los Altos Hills, CA (US); Chin-Wang Tu, Cupertino, CA (US)

(73) Assignee: Leotek Electronics Corporation, Lung-Tan, Tao-Yuan County (TW)

( * ) Notice: Subject to any disclaimer, the term of this patent is extended or adjusted under 35 U.S.C. 154(b) by 2 days.

(21) Appl. No.: 11/732,299

(22) Filed: Apr. 2, 2007

(65) Prior Publication Data

US 2007/0242466 A1    Oct. 18, 2007

Related U.S. Application Data

(60) Provisional application No. 60/789,673, filed on Apr. 5, 2006.

(51) Int. Cl.
*F21S 4/00* (2006.01)
*F21V 7/04* (2006.01)
*F21V 21/00* (2006.01)
*H01R 33/00* (2006.01)
*H01R 33/02* (2006.01)

(52) U.S. Cl. ............ 362/225; 362/555; 362/652; 362/249; 439/236

(58) Field of Classification Search .......... 362/249, 362/250, 555, 219, 223, 252, 649, 650, 651, 362/657, 658, 659, 224, 225, 228, 229, 362, 362/652; 439/236, 226, 239–244, 220, 228, 439/229, 614, 615, 13, 640
See application file for complete search history.

(56) References Cited

U.S. PATENT DOCUMENTS

| | | | |
|---|---|---|---|
| 2,352,496 A * | 6/1944 | Rose | 211/173 |
| 5,301,090 A | 4/1994 | Hed | |
| 5,416,679 A | 5/1995 | Ruskouski | |
| 5,459,955 A | 10/1995 | Ruskouski | |
| 5,526,236 A | 6/1996 | Burnes | |
| 5,616,042 A * | 4/1997 | Raby et al. | 439/226 |
| 5,688,042 A | 11/1997 | Madadi | |
| 5,904,415 A * | 5/1999 | Robertson et al. | 362/260 |
| 5,949,347 A | 9/1999 | Wu | |
| 5,986,576 A | 11/1999 | Armstrong | |
| 6,036,336 A | 3/2000 | Wu | |
| 6,092,913 A | 7/2000 | Edwards, Jr. | |
| 6,762,562 B2 * | 7/2004 | Leong | 315/51 |
| 6,787,999 B2 | 9/2004 | Stimac et al. | |
| 6,932,493 B2 * | 8/2005 | Giannopoulos et al. | 362/260 |
| 6,997,576 B1 * | 2/2006 | Lodhie et al. | 362/240 |
| 7,052,171 B1 * | 5/2006 | Lefebvre et al. | 362/649 |
| 7,114,830 B2 * | 10/2006 | Robertson et al. | 362/240 |

(Continued)

*Primary Examiner*—Jong-Suk (James) Lee
*Assistant Examiner*—David R Crowe
(74) *Attorney, Agent, or Firm*—DLA Piper LLP (US)

(57) ABSTRACT

A method and device for replacing a fluorescent tube lamp with an LED lamp. The LED lamp includes an elongated electrical assembly having ends terminating in first and second electrical connectors, and a plurality of LEDs mounted to the elongated electrical assembly. Mounting adaptors connect with the first and second electrical connectors, and have protruding pins to connect with conventional lamp socket connectors. The mounting adaptors have rotating connectors for connecting with the first and second electrical connectors of the LED lamp, so that the LED lamp orientation can be rotated after the LED lamp is fully mounted to the lamp socket connectors.

17 Claims, 6 Drawing Sheets

U.S. PATENT DOCUMENTS

| | | |
|---|---|---|
| 2002/0048174 A1 | 4/2002 | Pederson |
| 2002/0060526 A1* | 5/2002 | Timmermans et al. ...... 315/246 |
| 2004/0062041 A1* | 4/2004 | Cross et al. ................. 362/240 |
| 2006/0061988 A1 | 3/2006 | Johnson et al. |

* cited by examiner

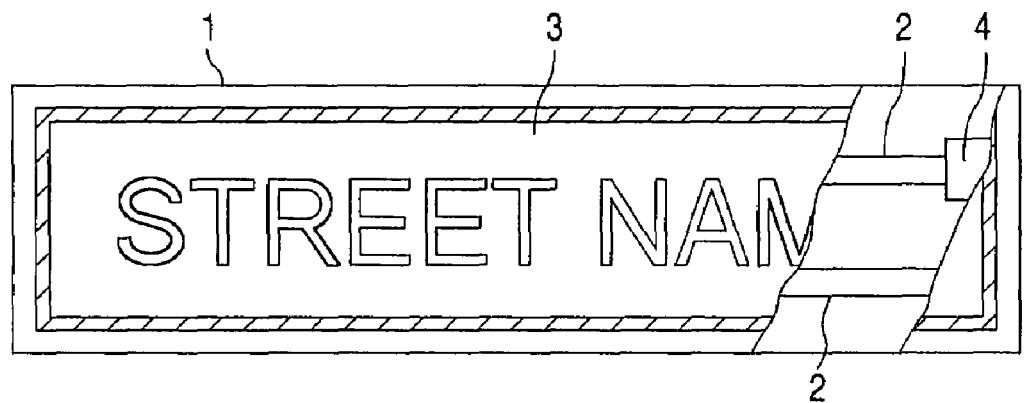
FIG. 1A
(PRIOR ART)
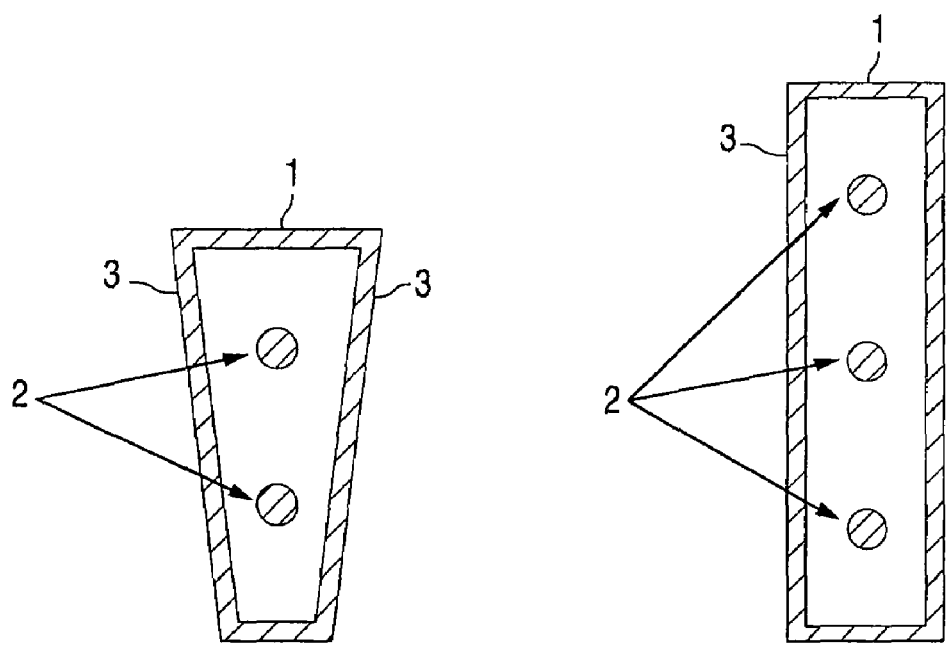
FIG. 1B
(PRIOR ART)
FIG. 2B
(PRIOR ART)

RETROFITTING OF FLUORESCENT TUBES WITH LIGHT-EMITTING DIODE (LED) MODULES FOR VARIOUS SIGNS AND LIGHTING APPLICATIONS

This application claims the benefit of U.S. Provisional Application No. 60/789,673, filed Apr. 5, 2006, and entitled Retrofitting of Fluorescent Tubes with Light-Emitting Diode (LED) Modules for Various Signs and Lighting Applications.

FIELD OF THE INVENTION

The present invention relates to the design and the installation of retrofit Light Emitting Diode (LED) modules to replace existing fluorescent tube lamps typically found in street lights, parking lot lights, and various other lighting applications. More particularly, the present invention relates to a method and apparatus for installing a retrofit LED module in a conventional fluorescent tube lamp housing.

BACKGROUND OF THE INVENTION

Light emitting diodes (LEDs) have been widely used in many applications to replace conventional incandescent lamps, fluorescent lamps, neon tube lamps and fiber optic lights. LEDs consume much less electrical power, are far more reliable, and exhibit much longer lifetimes, than their conventional counterparts. As a result, LEDs have been configured to replace conventional light sources for many applications. For example, LED lamps have been. developed to replace screw-in incandescent light bulbs for traffic signals (as shown in U.S. Pat. No. 6,036,336), and exit signs (as shown in U.S. Pat. Nos. 5,416,679, 5,459,955, 5,526,236, 5,688,042, 5,949,347). In each case, the LEDs are mounted onto a lamp housing having a conventional threaded electrical connector that engages with the threaded socket connector in the traffic signal lamp or exit sign. Thus, retrofitting the traffic signal and exit signs simply involves unscrewing the conventional lamp and screwing in the LED lamp.

Retrofitting with LED lamps the vast numbers of backlit commercial and street name signs, which utilize fluorescent lighting, is more problematic. These signs typically include a housing containing one or more fluorescent tube lamps, and one or more translucent face plates (sidewalls) that are back-illuminated by the fluorescent lamp(s) (i.e. to form characters, designs, symbols, etc.). FIGS. 1A and 1B illustrate a conventional backlit street name sign, which includes a housing 1, a pair of fluorescent tube lamps 2 and a pair of opposing translucent face plates 3 that indicate a street name. Each of the fluorescent tube lamps 2 are connected to and suspended by a pair of electrical connectors 4, which are well known in the art. Connectors 4 have receptacles that accept and make electrical connections with a pair of standard electrical pins protruding from each end of the fluorescent tube lamp 2. Connectors 4 physically support the fluorescent tube lamp by the pins, as well as apply an operating voltage across them. The face plates 3 are angled slightly downwardly for better viewing from below. FIGS. 2A and 2B illustrate a conventional backlit commercial sign, where there is only a single translucent face plate 3 (which is not angled downwardly), and three fluorescent tube lamps 2 for illumination.

Replacing the short-lifespan fluorescent tube lamps in conventional backlit commercial and street name signs can be difficult, because such signs are typically elevated and inaccessible, disposed over roadways, and/or hard to open. What is worse is that there is no standard size for such signs, for the fluorescent tube lamps 2 used therein, and for the spacing between opposing electrical connectors 4. Thus, designing an LED lamp retrofit that fits a wide variety of such signs, that evenly and sufficiently illuminates such signs, and that is easy to install without the need for special tools, has been difficult. Adding to that difficulty is the fact that many such signs are suspended in a way where the sign rocks, vibrates and shakes in the wind.

There is a need for a versatile LED lamp design for retrofitting conventional backlit commercial and street name signs that is easy to install and fits in a variety of sign sizes and configurations.

SUMMARY OF THE INVENTION

The present invention solves the aforementioned problems by providing a method and apparatus for installing a retrofit LED lamp module in a housing designed for fluorescent tube lamps.

An LED lamp, for use in a housing designed for fluorescent tube lights, includes an elongated electrical assembly having a first end terminating in a first electrical connector and a second end terminating in a second electrical connector, a plurality of LEDs mounted to the elongated electrical assembly, a first mounting adaptor having a first end electrically engagable with the first electrical connector and a second end terminating in an electrical connector having two protruding pins, and a second mounting adaptor having a first end electrically engagable with the second electrical connector and a second end terminating in an electrical connector having two protruding pins.

A method for retrofitting a fluorescent lamp (containing a fluorescent tube lamp connected between first and second socket connectors) includes removing the fluorescent tube lamp from the first and second socket connectors, and connecting an LED lamp to the first and second socket connectors. The LED lamp includes an elongated electrical assembly having a first end terminating in a first electrical connector and a second end terminating in a second electrical connector, a plurality of LEDs mounted to the elongated electrical assembly, a first mounting adaptor having a first end electrically engagable with the first electrical connector and a second end terminating in an electrical connector having two protruding pins, and a second mounting adaptor having a first end electrically engagable with the second electrical connector and a second end terminating in an electrical connector having two protruding pins. The connecting of the LED lamp to the first and second socket connectors includes connecting the two protruding pins of the first mounting adaptor to the first socket connector and connecting the two protruding pins of the second mounting adaptor to the second socket connector.

Other objects and features of the present invention will become apparent by a review of the specification, claims and appended figures.

BRIEF DESCRIPTION OF THE DRAWINGS

FIG. 1A is a partially broken away side view of a conventional backlit street name sign.

FIG. 1B is a cross-section view of the conventional backlit street name in FIG. 1A.

FIG. 2B is a side cross-section view of the conventional backlit commercial sign in FIG. 2A.

DETAILED DESCRIPTION OF THE PREFERRED EMBODIMENTS

The present invention relates to the design and the installation of retrofit LED modules to replace existing fluorescent tube lamps. Moreover, the present invention provides a method and apparatus for installing a retrofit LED lamp module in a housing designed for fluorescent tube lamps.

Figure 2A:
FIG. 2A is a partially broken away side view of a conventional backlit commercial sign.
Figure 3:
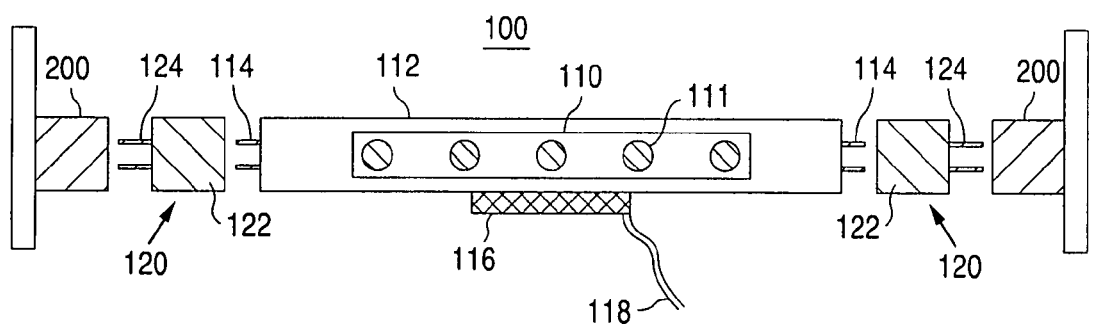
FIG. 3 is a schematic of an LED module according to an embodiment of the present invention.

In FIG. 3, a schematic of an LED module 100 according to an embodiment of the present invention is provided. As illustrated, LED module 100 includes a plurality of LEDs 111 mounted onto an elongated electrical assembly 110 (e.g. a printed circuit board, a plurality of electrical receptacles, etc.), and preferably housed within a translucent LED tube 112. On both ends, LED module 100 includes bi-pin connectors 114, which allow LED module 100 to electrically connect to mounting adaptors 120 via bi-pin holes 122. In a preferred embodiment, each mounting adaptor 120 further comprises bi-pin connectors 124, which allow each adaptor 120 to electrically connect to a conventional fluorescent tube socket 200. Conventional fluorescent tube sockets are well known, and include holes or channels for receiving and making electrical contact with bi-pin connectors.

Figure 4A:
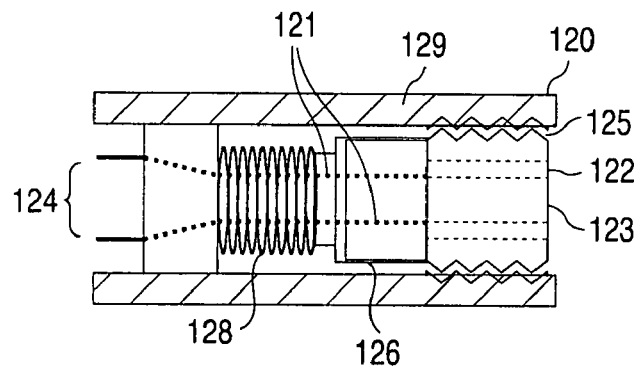
FIG. 4A is schematic of a mounting adaptor with extension wires within the coil and spacer of the mounting adaptor.
Figure 4B:
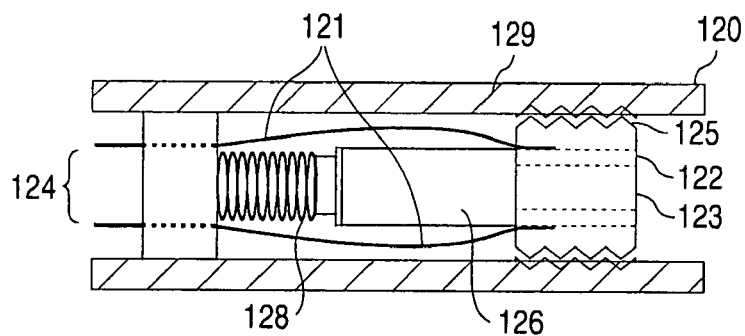
FIG. 4B is schematic of a mounting adaptor with extension wires outside the coil and spacer of the mounting adaptor.
Figure 5A:
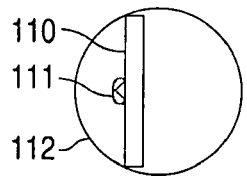
FIG. 5A is a cross section view of an LED tube, wherein LEDs are mounted on only one side of an electrical assembly.
Figure 5B:
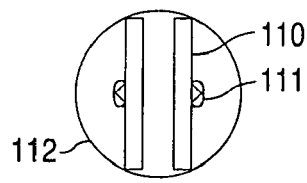
FIG. 5B is a cross section view of an LED tube, wherein LEDs are mounted on each of two surfaces of an electrical assembly.
Figure 5C:
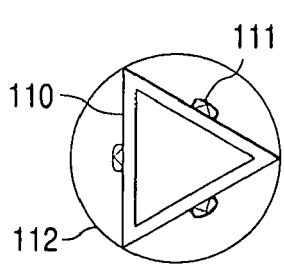
FIG. 5C is a cross section view of an LED tube, wherein LEDs are mounted onto an electrical assembly having a triangular configuration.
Figure 5D:
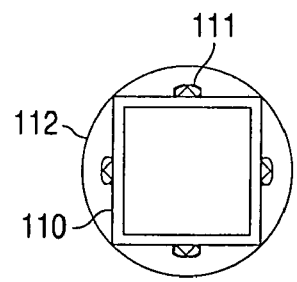
FIG. 5D is a cross section view of an LED tube, wherein LEDs are mounted onto an electrical assembly having a square configuration.
Figure 5E:
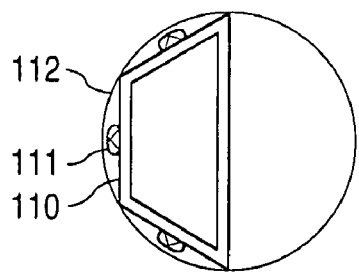
FIG. 5E is a cross section view of an LED tube, wherein LEDs are mounted onto an electrical assembly having a trapezoidal configuration.
Figure 5F:
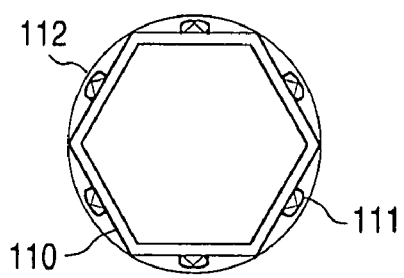
FIG. 5F is a cross section view of an LED tube, wherein LEDs are mounted onto an electrical assembly having a hexagon configuration.
Figure 5G:
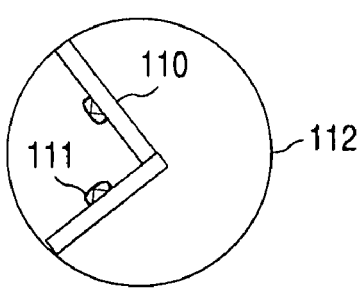
FIG. 5G is a cross section view of an LED tube, wherein LEDs are mounted onto an electrical assembly having two surfaces, and wherein the LEDs are partially angled towards each other.
Figure 5H:
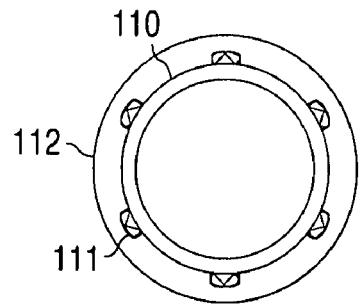
FIG. 5H is a cross section view of an LED tube, wherein LEDs are mounted onto an electrical assembly having a circular configuration.
Figure 5I:
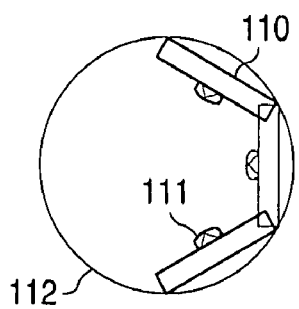
FIG. 5I is a cross section view of an LED tube, wherein LEDs are mounted onto an electrical assembly having three surfaces, and wherein the LEDs are partially angled towards each other.
Figure 5J:
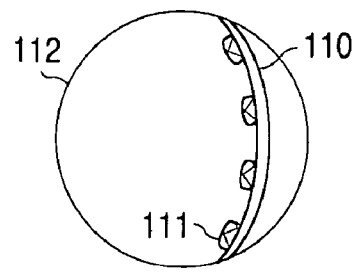
FIG. 5J is a cross section view of an LED tube, wherein LEDs are mounted onto an electrical assembly having a semicircle configuration.

Mounting adaptor 120 is designed to facilitate the installation of the LED retrofit tube onto existing fluorescent tube lighting fixtures. In FIGS. 4A and 4B, schematics of a mounting adaptor 120 according to embodiments of the present invention are provided. As illustrated, mounting adaptor 120 includes a housing 129, a rotatable bi-pin socket 123, extension wires 121, tube spacer 126, coil 128, and bi-pin connector 124. Optional rotation threads 125 can be included on the rotatable pin socket 123 and mounting adaptor housing 129 for adjusting the angular position of rotatable pin socket 123 relative to bi-pin connector 124. It should be further appreciated that the placement of extension wires 121 may also vary. For example, in the embodiment of FIG. 4A, extension wires 121 are located within the coil 128 and spacer 126 of mounting adaptor 120. In FIG. 4B, however, an alternative embodiment is provided, wherein extension wires 121 are located outside the coil 128 and spacer 126.

In a preferred embodiment, the insertion of mounting adaptor 120 into an existing fluorescent tube socket 200 allows for the orientation of LED module 100 to be easily adjusted within a conventional fluorescent tube lamp housing 1 via rotatable bi-pin socket 123. Namely, bi-pin connectors 124 will serve the equivalent function of bi-pin connectors on conventional fluorescent tube lamps, while coils 128 provide the necessary force between LED module 100 and mounting adaptor 120 so as to facilitate installation. Moreover, after installation of LED module 100 is complete, and wherein the desired orientation is set, pressure from each compressed coil 128 provides the necessary frictional force to firmly hold LED module 100 in place and to keep the orientation of the LED module 100 fixed. Optional rotation threads 125 can lack any inclination, whereby rotating pin socket 123 simply causes it to spin in place. Alternately, the rotation threads 125 can be inclined, whereby rotation of the pin socket 123 adjusts the distance between the rotatable pin socket 123 and bi-pin connector 124 to custom fit the LED lamp to the lamp fixture.

To retrofit a conventional sign, its housing if any is opened and the fluorescent tube lamp(s) therein are removed from sockets 200. A mounting adaptor 120 is inserted into each of the sockets 200 (i.e. pins 124 are inserted into socket 200), and LED module 100 is inserted into the mounting adaptors 120 (i.e. pins 114 are inserted into pin holes 122). It should be understood that the LED module 100 could be connected to the mounting adaptors 120 before or after the mounting adaptors 120 are connected to the sockets 200. Then, the LED module 100 is rotated to its desired rotational position (which possibly could be used to adjust the overall length of LED module 100 and mounting adaptors 120 between sockets 200), where the compressed coils 128 maintain this rotational position thereafter. The electrical connection is automatically made to supply the operating voltage to from the sockets 200, through the mounting adaptors 120, and to the LED module 100. The LED module preferably includes an internal power supply 116 that transforms the operating voltage from the sockets 200 to an operating voltage appropriate to the LEDs 111. Alternately, wires 118 extending from the internal power supply 116 could be used power the LED module 100 independent from the sockets 200 (as shown in FIG. 3), whereby sockets 200 and mounting adaptors 120 simply provide mechanical support to the pins 114 of LED module 100. It is also possible to make power supply 116 external to the LED module 100.

It should also be appreciated that LEDs 111 may be mounted onto electrical assembly 110 in a variety of ways.

Several examples of such configurations are provided in FIGS. 5A-5J. As illustrated, some of these configurations include configurations in which electrical assembly 110 comprises a single surface, a plurality of surfaces, a curved surface, and/or surfaces configured in particular shapes.

Figure 6A:
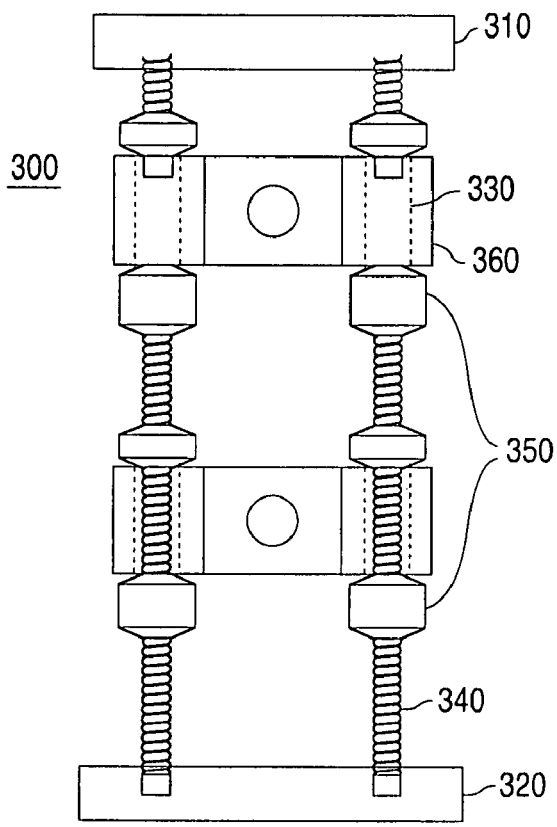
FIG. 6A is a front-view schematic of a vertical mounting support for the LED module of the present invention.
Figure 6B:
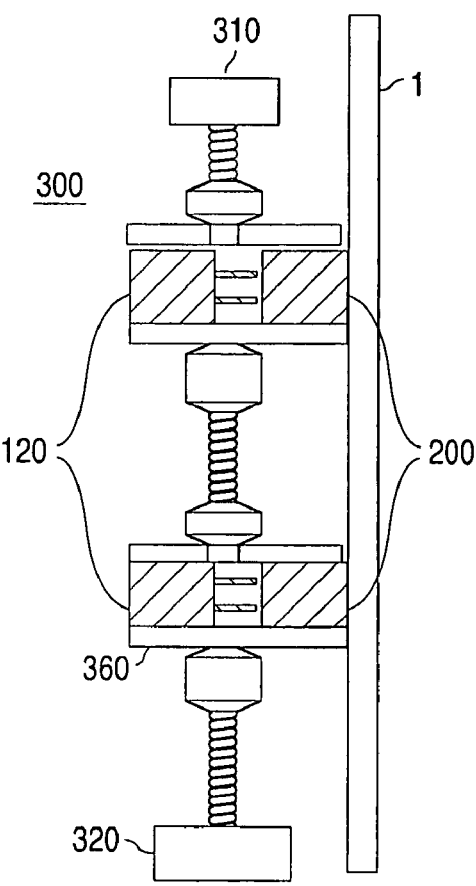
FIG. 6B is a side-view schematic of a vertical mounting support for the LED module of the present invention.

Depending on the length and the weight of the particular LED module 100 used, a special mechanical support structure might be necessary. Some street name signs, for example, because of their size, require mechanical support for there to be an adequate retrofit. In FIGS. 6A and 6B, exemplary schematics of such supports are provided. As illustrated, vertical support 300 comprises a top mount 310, a bottom mount 320, and an adjustable tube holder 360. In a preferred embodiment, adjustable tube holder 360 is used to support and secure LED module 100, wherein tube holder 360 is secured with position locking nuts 350 by inserting threads 340 into holes 330, as shown.

Figure 7:
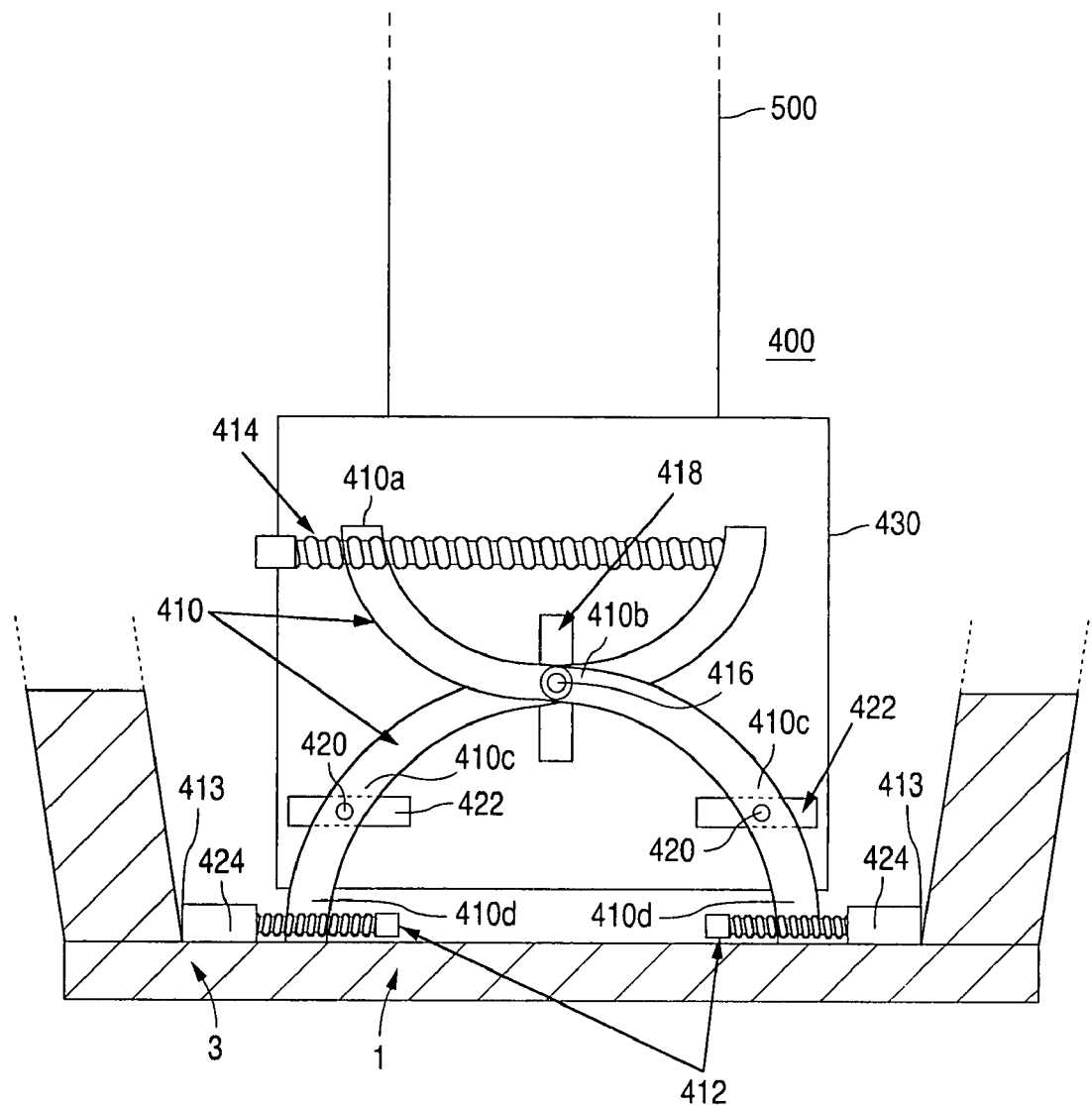
FIG. 7 is a side view of the mounting mechanism for the LED module of the present invention.

In applications requiring mechanical support a mounting mechanism 400 may be utilized as illustrated in FIG. 7. The mounting mechanism 400 includes a mounting member 430 either rigidly connected to or integrally formed as part of one of the support arms 500, a pair of scissor arms 410, a pair of adjustment screws 412, and a tightening screw 414. The scissor arms 410 are preferably S-shaped, and each includes an upper portion 410a, a mid-portion 410b, a lower mid portion 410c, and a lower portion 410d. The scissor arm mid portions 410b are rotatably connected together by a bolt 416 that extends through a vertical slot 418 formed in the mounting member 430. For each scissor arm 410, a bolt 420 extends from its lower mid-portion 410c and through a horizontal slot 422 formed in the mounting member 430. Each of the adjustment screws 412 is threaded through the lower portion 410d of one of the scissor arms 410, and terminates in an engagement surface 413. In the preferred embodiment, each adjustment screw 412 includes an engagement block of material 424 conducive to forming a friction fit (e.g. compressible or course materials, etc), with the engagement surface 413 at the end of the engagement block 424. The tightening screw 414 is threaded through one of the scissor arm upper portions 410a, and is rotatably engaged with the other scissor arm upper portion 410a. Each of the screws 412/414 includes a conventional adjustment end (Phillips, flat blade, Allen key, etc.) for rotation thereof, thus allowing the LED module 100 to be installed with no special tools (i.e. nothing more than just a screw driver or Allen key).

Figure 8A:
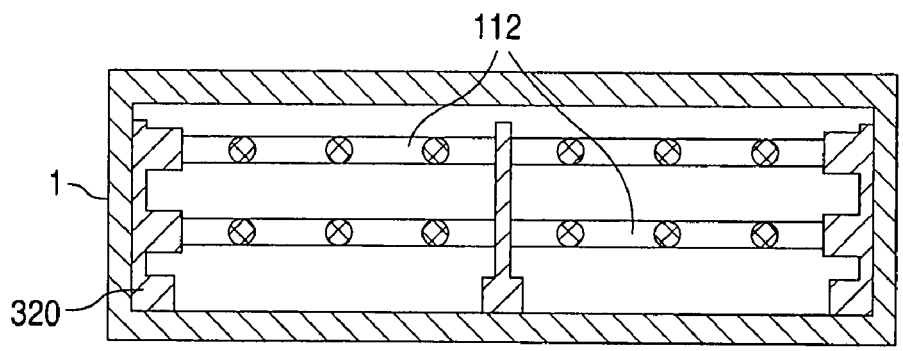
FIG. 8A is front-view schematic of an installed LED module according to an embodiment of the present invention.
Figure 8B:
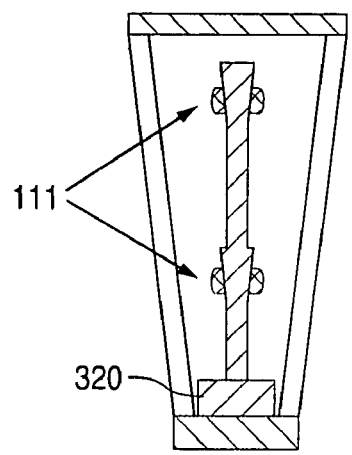
FIG. 8B is side-view schematic of an installed LED module according to an embodiment of the present invention.

To retrofit a conventional backlit sign mounting mechanism 400, its housing is opened and the fluorescent tube lamps therein are removed. The adjustment screws 412 of the LED module(s) to be inserted inside the sign are adjusted so that the engagement surfaces 413 for each pair of adjustment screws 412 are separated slightly less than the interior depth of the sign's housing at its base. After the LED module is placed inside the sign housing, each of the mounting mechanisms are operated by rotating its tightening screw 414 to separate the scissor arm upper portions 410a from each other, which also separates the lower portions 410d from each other as well, thus driving the engagement surfaces 413 away from each other and against the sign's sidewalls to form a secure friction fit there between. As the tightening screw 414 is adjusted, the bolts 416/420 slide in slots 418/422 to accommodate the movement of the scissor arms 410, while minimizing the vertical movement of the mounting member 430 during installation. Bolts 416/420 secure the scissor arms to the mounting member 430, to ensure support arm 500 (which is used to support the LED module 100) cannot move relative to the sign's housing once installation is complete. The minimum sign depth compatible with the mounting mechanism is dictated mainly by the sizes of the mounting member 430 and scissor arms 410, and the maximum sign depth compatible with the mounting mechanism 400 is dictated mainly by the length of the adjustment screws 412 (i.e. how far the engagement surfaces 413 can be separated). Thus, a single sized mounting mechanism 400 can be compatible with a very large range of sign depths. Shorter or longer adjustment screws 412 can be swapped in/out of scissor arms 410 to vary the range of compatible sign depths even further. Front and side view schematics of an installed LED module 100 according to an embodiment of the present invention are provided in FIGS. 8A and 8B, respectively.

Once the LED module 100 is affixed to the sign housing using the mounting mechanism 400, power supply 116 is electrically connected to the sign's electrical supply. As discussed previously, this can be done by hard wiring power supply 116 directly to LED module 100. Within such embodiment, if additional space is needed, socket 200 may be removed from the sign. Alternatively, power supply 116 can obtain power directly from socket 200 via power cord 118, which negates the need for any hardwiring.

It is to be understood that the present invention is not limited to the embodiment(s) described above and illustrated herein, but encompasses any and all variations falling within the scope of the appended claims. For example, as is apparent from the claims and specification, not all method steps need be performed in the exact order illustrated or claimed, but rather in any order that achieves the retrofit of LED lamps within conventional fluorescent lamp housings.

What is claimed is:

1. An LED lamp module for use in a housing designed for fluorescent tube lights, comprising:
    an elongated electrical assembly having a first end terminating in a first electrical connector and a second end terminating in a second electrical connector;
    a plurality of LEDs mounted to the elongated electrical assembly;
    a first mounting adaptor having a first end electrically engagable with the first electrical connector and a second end terminating in an electrical connector having two protruding pins; and
    a second mounting adaptor having a first end electrically engagable with the second electrical connector and a second end terminating in an electrical connector having two protruding pins;
    wherein:
        the first mounting adaptor further comprises a first housing,
        the first end of the first mounting adaptor comprises a third electrical connector that is removably engagable with the first electrical connector and is rotatable relative to the first housing,
        the first mounting adaptor further comprising a spring for exerting a force on the third electrical connector to increase rotational friction between third electrical connector and the first housing,
        the second mounting adaptor further comprises a second housing,
        the first end of the second mounting adaptor comprises a fourth electrical connector that is removably engagable with the second electrical connector and is rotatable relative to the second housing, and
        the second mounting adaptor further comprising a spring for exerting a force on the fourth electrical connector to increase rotational friction between fourth electrical connector and the second housing.

2. The LED lamp module of claim 1, wherein the third and fourth electrical connectors each comprise a bi-pin socket.

3. The LED lamp module of claim 1, wherein:
the third electrical connector is electrically connected to the two protruding pins of the first mounting adaptor; and
the fourth electrical connector is electrically connected to the two protruding pins of the second mounting adaptor.

4. The LED lamp module of claim 1, wherein:
the third electrical connector and the first housing are rotatably engaged together via one or more rotation threads on the third electrical connector rotatably engaged with one or more rotation threads on the first housing; and
the fourth electrical connector and the second housing are rotatably engaged together via one or more rotation threads on the fourth electrical connector rotatably engaged with one or more rotational threads on the second housing.

5. The LED lamp module of claim 4, wherein the one or more rotational threads on the third and fourth electrical connectors, and on the first and second housings, are inclined.

6. The LED lamp module of claim 1, wherein the electrical assembly comprises a single surface on which the plurality of LEDs are mounted.

7. The LED lamp module of claim 6, wherein the single surface is curved.

8. The LED lamp module of claim 7, wherein the surface is cylindrically-shaped.

9. The LED lamp module of claim 1, wherein the electrical assembly comprises a plurality of surfaces each of which including at least one of the plurality of LEDs mounted thereon.

10. The LED lamp module of claim 9, wherein the plurality of surfaces are adjoined.

11. The LED lamp module of claim 10, wherein the plurality of surfaces are adjoined such that the respective angles between each pair of adjoining surfaces are the same.

12. The LED lamp module of claim 10, wherein the plurality of surfaces includes first and second surfaces adjoined at an angle of less than ninety degrees.

13. The LED lamp module of claim 1, further comprising:
a vertical support for supporting the electrical assembly, wherein a height of the vertical support is adjustable.

14. The LED lamp module of claim 1, further comprising:
a translucent tube disposed around the elongated electrical assembly.

15. A method for retrofitting a fluorescent lamp containing a fluorescent tube lamp connected between first and second socket connectors, the method comprising:
removing the fluorescent tube lamp from the first and second socket connectors;
connecting an LED lamp to the first and second socket connectors, wherein the LED lamp comprises:
an elongated electrical assembly having a first end terminating in a first electrical connector and a second end terminating in a second electrical connector,
a plurality of LEDs mounted to the elongated electrical assembly,
a first mounting adaptor having:
a first end with a third electrical connector electrically and removably engagable with the first electrical connector and a second end terminating in an electrical connector having two protruding pins, and
a first housing, wherein the third electrical connector is rotatable relative to the first housing,
a first spring for exerting a force on the third electrical connector to increase rotational friction between third electrical connector and the first housing;
a second mounting adaptor having:
a first end with a fourth electrical connector electrically and removably engagable with the second electrical connector and a second end terminating in an electrical connector having two protruding pins,
a second housing, wherein the fourth electrical connector is rotatable relative to the second housing,
a second spring for exerting a force on the fourth electrical connector to increase rotational friction between fourth electrical connector and the second housing;
wherein the connecting of the LED lamp to the first and second socket connectors includes:
connecting the two protruding pins of the first mounting adaptor to the first socket connector and connecting the two protruding pins of the second mounting adaptor to the second socket connector;
connecting the third electrical connector with the first electrical connector; and
connecting the fourth electrical connector with the second electrical connector; and
rotating the LED lamp after the connection to the first and second socket connectors, wherein the third electrical connector rotates relative to the first housing and the fourth electrical connector rotates relative to the second housing, and wherein the rotating of the LED lamp is performed against the increased rotational friction from the first and second springs.

16. The method of claim 15, wherein:
the third electrical connector and the first housing are rotatably engaged together via inclined rotation threads;
the fourth electrical connector and the second housing are rotatably engaged together via inclined rotation threads; and
the rotating of the LED lamp causes a change in an overall length of the LED lamp.

17. The method of claim 15 further comprising;
providing a vertical support for the LED lamp, wherein a height of the vertical support is adjustable.

* * * * *